(12) United States Patent
Wang et al.

(10) Patent No.: US 11,993,175 B2
(45) Date of Patent: May 28, 2024

(54) ENERGY MANAGEMENT SYSTEM FOR AN ELECTRIC VEHICLE

(71) Applicant: GM Global Technology Operations LLC, Detroit, MI (US)

(72) Inventors: Yue-Yun Wang, Troy, MI (US); Garrett M. Seeman, Novi, MI (US); Alfred Zhang, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 448 days.

(21) Appl. No.: 17/387,449

(22) Filed: Jul. 28, 2021

(65) Prior Publication Data

US 2023/0030820 A1    Feb. 2, 2023

(51) Int. Cl.
| | | |
|---|---|---|
| *B60L 58/00* | (2019.01) | |
| *B60L 58/12* | (2019.01) | |
| *B60L 58/20* | (2019.01) | |
| *H01M 10/48* | (2006.01) | |

(52) U.S. Cl.
CPC .............. *B60L 58/20* (2019.02); *B60L 58/12* (2019.02); *H01M 10/482* (2013.01)

(58) Field of Classification Search
CPC ........ B60L 58/20; B60L 58/12; H01M 10/482
USPC .......................................................... 701/22
See application file for complete search history.

(56) References Cited

U.S. PATENT DOCUMENTS

| | | | | |
|---|---|---|---|---|
| 2015/0039391 A1* | 2/2015 | Hershkovitz | ...... | G06Q 30/0202 705/7.31 |
| 2015/0233729 A1* | 8/2015 | Arita | ....... | G06F 17/00 701/22 |
| 2016/0200216 A1* | 7/2016 | Fultz | ....... | B60L 58/21 320/136 |
| 2020/0406782 A1* | 12/2020 | Brunet | ....... | B60L 58/12 |
| 2022/0077514 A1* | 3/2022 | Kim | ....... | G01R 31/3648 |

* cited by examiner

*Primary Examiner* — Mahmoud S Ismail
(74) *Attorney, Agent, or Firm* — Vivacqua Crane, PLLC

(57) ABSTRACT

A supervisory computer is used with an energy management system of an electric vehicle. The energy management system includes a battery system having a plurality of battery subsystems. One of the battery subsystems is an abnormal battery subsystem while the remaining battery subsystems are normal battery subsystems. The supervisory computer includes at least one processor and at least one non-transitory computer-readable medium. The processor monitors the remaining state of charge, capacity, and resistance of the battery system and monitor the remaining state of charge and capacity of the abnormal battery subsystem, calculate a low integration bound value, calculate a remaining energy value for all of the normal battery subsystems with respect to the low integration value, calculate a remaining energy value for the abnormal battery subsystem, and summate the remaining energy values of the normal and abnormal battery subsystems to determine a global remaining energy value for the battery system.

20 Claims, 4 Drawing Sheets

ENERGY MANAGEMENT SYSTEM FOR AN ELECTRIC VEHICLE

The present disclosure relates to a vehicle electrical system, and more particularly to an energy management system for an electric vehicle that determines a global remaining energy value for a battery system.

In recent years, the use of electric motors to power vehicles has increased exponentially. To power the electric motors, battery packs comprised of numerous battery cells are utilized. Most battery cells can maintain a charge suitable to power the vehicle over a range of several hundred miles. However, occasionally a battery cell may hold less charge than the remaining battery cells. Because the abnormal battery cell holds a lower charge than the normal battery cells, the abnormal battery cell continuously draws from the charge of the normal battery subsystems which reduces the overall remaining energy of the battery pack. Current energy management systems assess the remaining energy of the battery pack, but do not have an accurate way to account for the draw from the abnormal battery cell. Instead, current energy management systems calculate remaining energy under the assumption that all the battery cells are functioning properly or only have a rough estimate of cell performance spread. As such, the vehicle has less remaining energy (and less available range) than what is communicated to the operator of the vehicle. This can cause the electric vehicle to run out of electrical energy before reaching the operator's desired destination, leaving the operator stranded.

Thus, while existing energy management systems achieve their intended purpose, there is a need for a new and improved energy management system that addresses these issues.

SUMMARY

According to several aspects of the present disclosure, a supervisory computer for an energy management system of an electric vehicle is provided. The energy management system comprises a battery system configured to power the electric vehicle and comprised of a plurality of battery subsystems. One of the battery subsystems is further defined as an abnormal battery subsystem. The remaining battery subsystems are further defined as normal battery subsystems. The supervisory computer comprises at least one processor and at least one non-transitory computer-readable medium including instructions such that the processor is programmed to monitor a remaining state of charge, a capacity, and a resistance of the battery system and monitor a remaining state of charge and a capacity of the abnormal battery subsystem. The processor is further programmed to calculate a low integration bound value from the remaining state of charge and capacity of the battery system and from the remaining state of charge and the capacity of the abnormal battery subsystem. The processor is further programmed to calculate a remaining energy value for all of the normal battery subsystems with respect to the low integration value, calculate a remaining energy value for the abnormal battery subsystem, and summate the remaining energy values of the normal battery subsystems and the abnormal battery subsystem to determine a global remaining energy value for the battery system.

In one aspect, the processor is further programmed to calculate an actual energy consumption rate value of the electric vehicle based on at least one vehicle consumption rate variable and calculate a remaining travel range value based on the global remaining energy value and the actual energy consumption rate value.

In another aspect, the processor is further programmed to communicate with a global navigation satellite system (GNSS) network to ascertain a location of the electric vehicle and a destination, calculate a travel distance value from a route between the location of the electric vehicle and the destination, compare the remaining travel range value to the travel distance value, and determine if the electric vehicle will reach the destination.

In another aspect, the processor is further programmed to calculate a maximum energy consumption rate value based upon the travel distance value and adjust the vehicle consumption rate variable to lower the actual energy consumption rate value to be less than or equal to the maximum energy consumption rate value if the remaining travel range value is less than the travel distance value.

In another aspect, the processor being programmed to calculate the low integration bound value from the remaining state of charge and capacity of the battery system and from the remaining state of charge and the capacity of the abnormal battery subsystem is further defined as the processor being programmed to calculate the low integration bound value according to:

$$a = SOC_{rem} + \frac{SOC_{ab1\text{-}rem} Cap_{ab1}}{Cap}$$

wherein a is the low integration bound value, wherein $SOC_{rem}$ is the remaining state of charge of the battery system, wherein Cap is the capacity of the battery system, wherein $SOC_{ab1\text{-}rem}$ is the remaining state of charge of the abnormal battery subsystem, and wherein $Cap_{ab1}$ is the capacity of the abnormal battery subsystem.

In another aspect, the processor being programmed to calculate the remaining energy value for all of the normal battery subsystems with respect to the low integration value is further defined as the processor being programmed to calculate the remaining energy value for all of the normal battery subsystems according to:

$$\Delta E_{norm} = (n_{normal})[\int_a^{SOC_{rem}}(V_{oc}-V_{polar})dSOC]Cap$$

wherein $\Delta E_{norm}$ is the remaining energy value for all of the normal battery subsystems, wherein $n_{normal}$ is the number of normal battery subsystems, wherein $V_{oc}$ is the open circuit voltage of one of the normal battery subsystems, and wherein $V_{polar}$ is the polar voltage of one of the normal battery subsystems, according to the resistance of one of the normal battery subsystems.

In another aspect, the processor being programmed to calculate the remaining energy value for the abnormal battery subsystem is further defined as the processor being programmed to calculate the remaining energy value for the abnormal battery subsystem according to:

$$\Delta E_{ab} = (n_{normal})[\int_0^{SOC_{ab1\text{-}rem}}(V_{oc}-V_{polar})dSOC]Cap_{ab1}$$

wherein $\Delta E_{ab}$ is the remaining energy value for the abnormal battery subsystem.

According to several aspects of the present disclosure, an energy management system of an electric vehicle is provided. The energy management system comprises a battery system configured to power the electric vehicle and comprised of a plurality of battery subsystems, with one of the battery subsystems further defined as an abnormal battery subsystem and with the remaining battery subsystems further defined as normal battery subsystems. The energy management system further comprises a supervisory computer comprising at least one processor and at least one non-transitory computer-readable medium. The at least one non-transitory computer-readable medium includes instructions such that the processor is programmed to monitor a remaining state of charge, a capacity, and a resistance of the battery system and monitor a remaining state of charge and a capacity of the abnormal battery subsystem. The processor is further programmed to calculate a low integration bound value from the remaining state of charge and capacity of the battery system and from the remaining state of charge and the capacity of the abnormal battery subsystem. The processor is further programmed to calculate a remaining energy value for all of the normal battery subsystems with respect to the low integration value, calculate a remaining energy value for the abnormal battery subsystem, and summate the remaining energy values of the normal battery subsystems and the abnormal battery subsystem to determine a global remaining energy value for the battery system.

In one aspect, the processor of the supervisory computer is further programmed to calculate an actual energy consumption rate value of the electric vehicle based on at least one vehicle consumption rate variable and calculate a remaining travel range value based on the global remaining energy value and the actual energy consumption rate value.

In another aspect, the processor of the supervisory computer is further programmed to communicate with a global navigation satellite system (GNSS) network to ascertain a location of the electric vehicle and a destination, calculate a travel distance value from a route between the location of the electric vehicle and the destination, compare the remaining travel range value to the travel distance value, and determine if the electric vehicle will reach the destination.

In another aspect, the energy management system further comprises a navigation interface configured to provide navigation instructions to an operator of the electric vehicle, with the processor of the supervisory computer further programmed to construct the navigation instructions from the route between the location of the electric vehicle and the destination and transmit the navigation instructions to the navigation interface for dissemination to the operator.

According to several aspects of the present disclosure, a method of operating a supervisory computer for an energy management system of an electric vehicle is provided. The energy management system comprises a battery system configured to power the electric vehicle and comprised of a plurality of battery subsystems, with one of the battery subsystems further defined as an abnormal battery subsystem and with the remaining battery subsystems further defined as normal battery subsystems. The supervisory computer comprises at least one processor and at least one non-transitory computer-readable medium. The method comprises monitoring a remaining state of charge, a capacity, and a resistance of the battery system and monitoring a remaining state of charge and a capacity of the abnormal battery subsystem. The method further comprises calculating a low integration bound value from the remaining state of charge and capacity of the battery system and from the remaining state of charge and the capacity of the abnormal battery subsystem. The method further comprises calculating a remaining energy value for all of the normal battery subsystems with respect to the low integration value, calculating a remaining energy value for the abnormal battery subsystem, and summating the remaining energy values of the normal battery subsystems and the abnormal battery subsystem to determine a global remaining energy value for the battery system.

In one aspect, the method further comprises calculating an actual energy consumption rate value of the electric vehicle based on at least one vehicle consumption rate variable and calculating a remaining travel range value based on the global remaining energy value and the actual energy consumption rate value.

In another aspect, the method further comprises communicating with a global navigation satellite system (GNSS) network to ascertain a location of the electric vehicle and a destination, calculating a travel distance value from a route between the location of the electric vehicle and the destination, comparing the remaining travel range value to the travel distance value, and determining if the electric vehicle will reach the destination.

In another aspect, the method further comprises calculating a maximum energy consumption rate value based upon the travel distance value and adjusting the vehicle consumption rate variable to lower the actual energy consumption rate value to be less than or equal to the maximum energy consumption rate value if the remaining travel range value is less than the travel distance value.

In another aspect, the vehicle consumption rate variable is a velocity of the electric vehicle and adjusting the vehicle consumption rate variable is further defined as lowering the velocity of the electric vehicle to lower the actual energy consumption rate value to be less than or equal to the maximum energy consumption rate value if the remaining travel range value is less than the travel distance value.

In another aspect, the energy management system further comprises a navigation interface configured to provide navigation instructions to an operator of the electric vehicle, with the method further comprising constructing the navigation instructions from the route between the location of the electric vehicle and the destination and transmitting the navigation instructions to the navigation interface for dissemination to the operator.

In another aspect, calculating the low integration bound value from the remaining state of charge and capacity of the battery system and from the remaining state of charge and the capacity of the abnormal battery subsystem is further defined as calculating the low integration bound value according to:

$$a = SOC_{rem} + \frac{SOC_{ab1\text{-}rem} Cap_{ab1}}{Cap}$$

wherein a is the low integration bound value, wherein $SOC_{rem}$ is the remaining state of charge of the battery system, wherein Cap is the capacity of the battery system, wherein $SOC_{ab1\text{-}rem}$ is the remaining state of charge of the abnormal battery subsystem, and wherein $Cap_{ab1}$ is the capacity of the abnormal battery subsystem.

In another aspect, calculating the remaining energy value for all of the normal battery subsystems with respect to the low integration value is further defined as calculating the remaining energy value for all of the normal battery subsystems according to:

$$\Delta E_{norm} = (n_{normal})[\int_a^{SOC_{rem}}(V_{oc} - V_{polar})dSOC]Cap$$

wherein $\Delta E_{norm}$ is the remaining energy value for all of the normal battery subsystems, wherein $n_{normal}$ is the number of normal battery subsystems, wherein $V_{oc}$ is the open circuit voltage of one of the normal battery subsystems, and wherein $V_{polar}$ is the polar voltage of one of the normal battery subsystems, according to the resistance of one of the normal battery subsystems.

In another aspect, calculating the remaining energy value for the abnormal battery subsystem is further defined as calculating the remaining energy value for the abnormal battery subsystem according to:

$$\Delta E_{ab} = (n_{normal})[\int_0^{SOC_{ab1\text{-}rem}}(V_{oc} - V_{polar})dSOC]Cap_{ab1}$$

wherein $\Delta E_{ab}$ is the remaining energy value for the abnormal battery subsystem.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
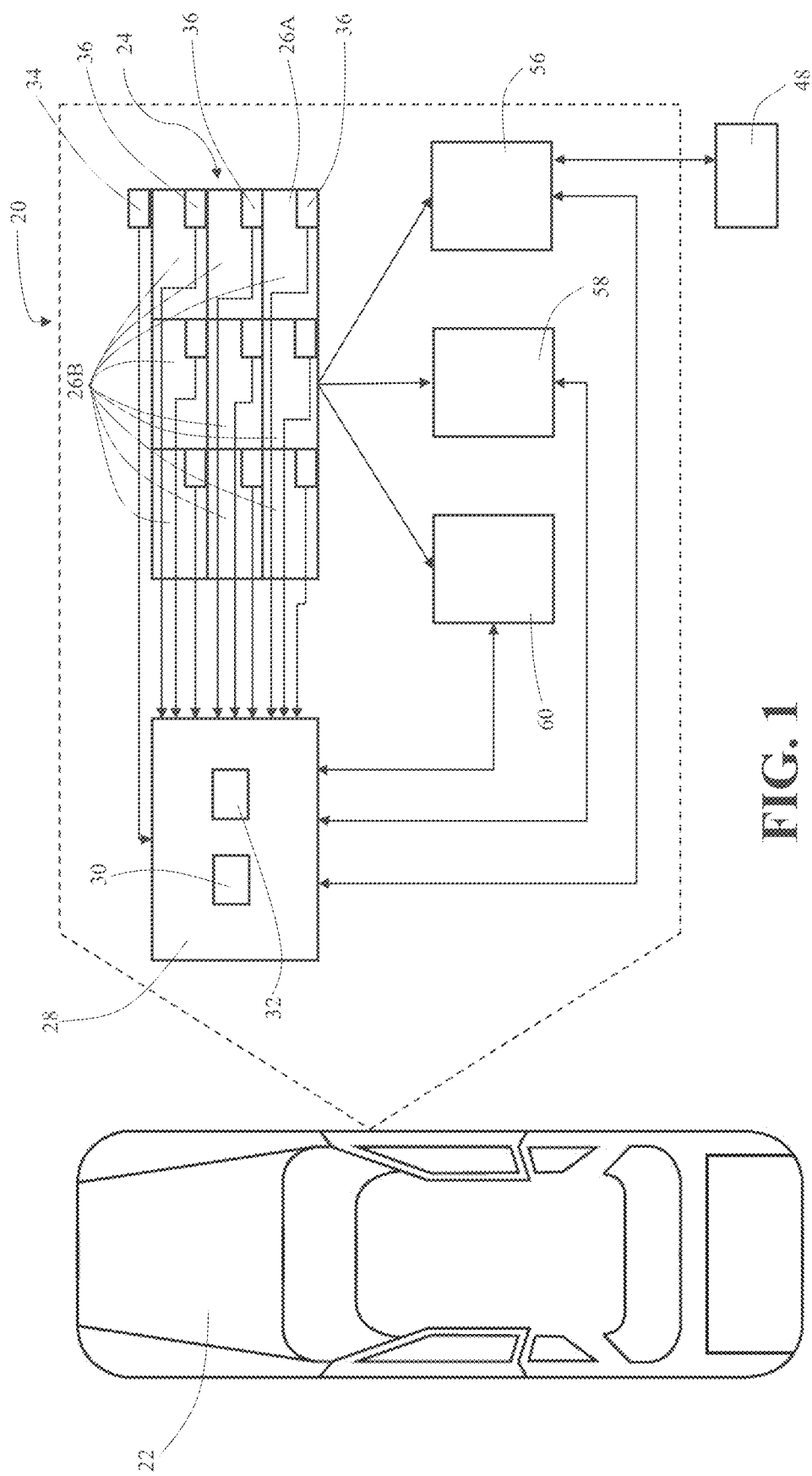
FIG. 1 is a schematic view of one example of an electric vehicle having an energy management system with a supervisory computer in communication with a battery system having an abnormal battery subsystem and a plurality of normal battery subsystems.

Referring to FIG. 1, according to several aspects of the present disclosure, an energy management system 20 of an electric vehicle 22 is generally shown. The energy management system 20 comprises a battery system 24 configured to power the electric vehicle and comprised of a plurality of battery subsystems 26, with one of the battery subsystems 26 further defined as an abnormal battery subsystem 26A and with the remaining battery subsystems 26 further defined as normal battery subsystems 26B. The abnormal battery subsystem 26A holds a lower charge than each of the normal battery subsystems 26B. Under optimal conditions, all of the battery subsystems 26 are defined as the normal battery subsystems 26B. However, different conditions can lead to a battery subsystem 26 being defined as the abnormal battery subsystem 26A. In one example, the abnormal battery subsystem 26A is a battery subsystem 26 that has reached end of life and is incapable of holding a charge similar to that of the normal battery subsystems 26B, commonly referred to as a droop cell. In another example, the 'abnormal' battery subsystem 26A is chemically different from the normal battery subsystems 26B and is incapable of holding a charge or voltage similar to that of the normal battery subsystems 26B. Such mixed-chemistry conditions can occur due to changes in the production of the battery subsystem 26 (e.g., different electrolytes, electrodes, formation charge, etc.) driven by material availability, quality control data, etc. The mixed-chemistry conditions can occur during initial assembly of the battery system 24 or during servicing of the battery system 24 (e.g., replacement of the battery subsystem 26).

The battery subsystems 26 are components that collectively form the battery system 24. Commonly, one or more battery packs provide electrical power to the electric vehicle 22. Each battery pack may comprise one or more battery modules. Each battery module may comprise one or more battery cells. As such, in one example, the battery subsystems 26 are the battery packs with collection of battery packs forming the battery system 24. In another example, the battery subsystems 26 are the battery modules, with the individual battery pack in which the battery modules are disposed defining the battery system 24. In another example, the battery subsystems 26 are the battery cells, with the individual battery module in which the battery cells are disposed defining the battery system 24. However, the battery subsystems 26 may be any collection of components that collectively form a battery system 24.

Because the abnormal battery subsystem 26A may hold a lower charge than the normal battery subsystems 26B, the abnormal battery subsystem 26A continuously draws from the charge of the normal battery subsystems 26B which reduces the overall remaining energy of the battery system 24. As such, predicting the overall remaining energy of any battery system when an abnormal battery subsystem is present requires accounting for the affect the abnormal battery subsystem on the battery system. To that end, the energy management system 20 further comprises a supervisory computer 28 comprising at least one processor 30 and at least one non-transitory computer-readable medium 32. The at least one non-transitory computer-readable medium 32 includes instructions such that the processor 30 is programmed to monitor a remaining state of charge, a capacity, and a resistance of the battery system 24 and monitor a remaining state of charge and a capacity of the abnormal battery subsystem 26A. The processor 30 is further programmed to calculate a low integration bound value from the remaining state of charge and capacity of the battery system 24 and from the remaining state of charge and the capacity of the abnormal battery subsystem 26A. The processor 30 is further programmed to calculate a remaining energy value for all of the normal battery subsystems 26B with respect to the low integration value, calculate a remaining energy value for the abnormal battery subsystem 26A, and summate the remaining energy values of the normal battery subsystems 26B and the abnormal battery subsystem 26A to determine a global remaining energy value for the battery system 24.

The battery system 24 may include an electronic chip 34 in electronic communication with the supervisory computer 28 and configured to detect the remaining state of charge, the capacity, and the resistance of the battery system 24. Likewise, each of the battery subsystems 26 may include an electronic chip 36 in electronic communication with the supervisory computer 28 and configured to detect the remaining state of charge and capacity of the battery system 24. The supervisory computer 28 may receive signals from the electronic chips 34, 36 indicating the detected remaining state of charge, capacity, and resistance, from which the supervisory computer 28 monitors the battery system 24 and the battery subsystem 26. Examples of monitoring the remaining state of charge, capacity, and resistance of a battery system and/or battery subsystem are shown and described in U.S. patent application Ser. No. 16/743,839, filed on Jan. 15, 2020 and entitled "METHOD AND SYS- TEM FOR BATTERY CAPACITY ESTIMATION," the disclosure of which is hereby incorporated by reference.

In general, the supervisory computer 28 calculates the remaining energy in each of the battery subsystems 26 and summates the values to determine the global remaining energy value for the battery system 24. The charge drawn by the abnormal battery subsystem 26A from the normal battery subsystems 26B is reflected in the calculation of the remaining energy of the normal battery subsystems 26B through the low integration bound value. The processor 30 being programmed to calculate the low integration bound value from the remaining state of charge and capacity of the battery system 24 and from the remaining state of charge and the capacity of the abnormal battery subsystem 26A may be further defined as calculating the low integration bound value according to:

$$a = SOC_{rem} + \frac{SOC_{ab1-rem} Cap_{ab1}}{Cap}$$

wherein a is the low integration bound value, wherein $SOC_{rem}$ is the remaining state of charge of the battery system 24, wherein Cap is the capacity of the battery system 24, wherein $SOC_{ab1-rem}$ is the remaining state of charge of the abnormal battery subsystem 26A, and wherein $Cap_{ab1}$ is the capacity of the abnormal battery subsystem 26A. The processor 30 being programmed to calculate the remaining energy value for all of the normal battery subsystems 26B with respect to the low integration value may be further defined as calculating the remaining energy value for all of the normal battery subsystems 26B according to:

$$\Delta E_{norm} = (n_{normal})[\int_{a}^{SOC_{rem}} (V_{oc} - V_{polar}) dSOC] Cap$$

wherein $\Delta E_{norm}$ is the remaining energy value for all of the normal battery subsystems 26B, wherein $n_{normal}$ is the number of normal battery subsystems 26B, wherein $V_{oc}$ is the open circuit voltage of one of the normal battery subsystems 26B, and wherein $V_{polar}$ is the polar voltage of one of the normal battery subsystems 26B, according to the resistance of one of the normal battery subsystems 26B. The processor 30 being programmed to calculate the remaining energy value for the abnormal battery subsystem 26A is further defined as calculating the remaining energy value for the abnormal battery subsystem 26A according to:

$$\Delta E_{ab} = (n_{normal})[\int_{0}^{SOC_{ab1-rem}} (V_{oc} - V_{polar}) dSOC] Cap_{ab1}$$

wherein $\Delta E_{ab1}$ is the remaining energy value for the abnormal battery subsystem 26A.

Figure 2:
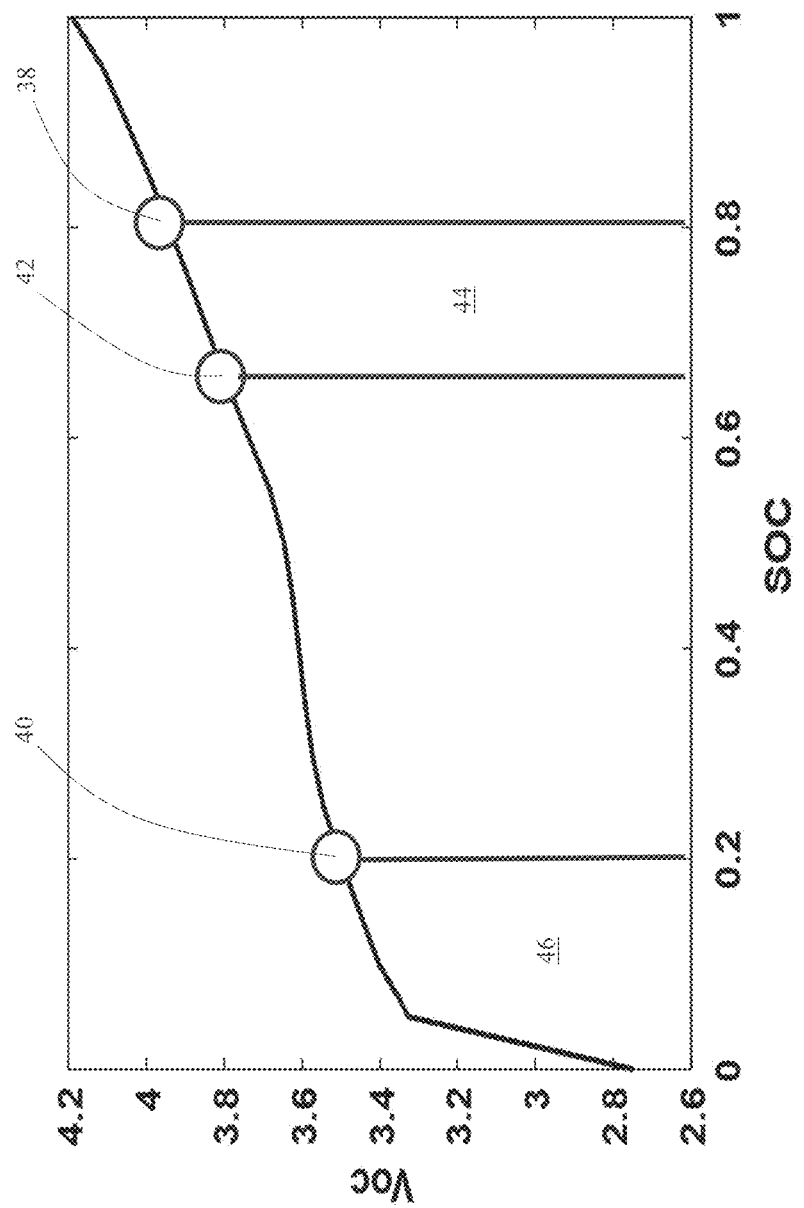
FIG. 2 is line graph showing the voltage over the state of charge of the battery system and showing a remaining energy value of the abnormal battery subsystem and a remaining energy value of one of the normal battery subsystems.

FIG. 2 is graphical representation of the calculations described above. More specifically, FIG. 2 shows a line graph displaying the relationship between the open circuit voltage (y-axis) and the state of charge (x-axis). The remaining state of charge of one of the normal battery subsystems 26B ($SOC_{rem}$) is shown on the line at reference numeral 38. The remaining state of charge of the abnormal battery subsystem 26A ($SOC_{ab1-rem}$) is shown on the line at the reference numeral 40. The low integration bound value (a) is shown on the line at the reference numeral 42. Reference numeral 44 shows an area under the line between the low integration bound value (a) and the remaining state of charge of the one of the normal battery subsystems 26B ($SOC_{rem}$). The area under the line at reference numeral 44 represents the remaining energy value for each of the normal battery subsystems 26B (i.e., $\Delta E_{norm}$ divided by $n_{normal}$). Reference numeral 46 shows an area under the line between zero and the remaining state of charge of the abnormal battery subsystem 26A ($SOC_{ab1-rem}$). The area under the line at reference numeral 46 represents the remaining energy value for the abnormal battery subsystem 26A ($\Delta E_{ab1}$).

More than one abnormal battery subsystems 26A may be present in the battery system 24. The same general calculations described above may be used to assess the global remaining energy value of the battery subsystem 26. More specifically, the processor 30 may be programmed to calculate the remaining energy value for all of the normal battery subsystems 26B (i.e., $\Delta E_{norm}$ as shown above). In this calculation, the low integration bound value (a) corresponds to the weakest of the abnormal battery subsystems 26A (i.e., the abnormal battery subsystem 26A with the lowest ability to hold a charge). The processor 30 may be programmed to calculate the remaining energy value for the weakest of the abnormal battery subsystems 26A, which corresponds to $\Delta E_{ab1}$ as shown above. The processor 30 may be programmed to calculate the remaining energy value for each of the remaining abnormal battery subsystems 26A. More specifically, the remaining energy value is calculated individually for each of the remaining abnormal battery subsystems 26A. The remaining energy value is calculated from a low integration bound value (x) that is a function of state of charge and the capacity of the weakest abnormal battery subsystem 26A and that particular abnormal battery subsystem 26A. The low integration bound value (x) of any of the remaining abnormal battery subsystems 26A is calculated according to:

$$x = SOC_{abx-rem} + \frac{SOC_{ab1-rem} Cap_{ab1}}{Cap_{abx}}$$

wherein $SOC_{abx-rem}$ is the remaining state of charge of any one of the remaining abnormal battery subsystems 26A and $Cap_{abx}$ is the capacity of that particular abnormal battery subsystem 26A. The remaining energy value for that particular abnormal battery subsystem 26A is calculated according to:

$$\Delta E_{abx} = (n_{normal})[\int_{x}^{SOC_{abx1-rem}} (V_{oc} - V_{polar}) dSOC] Cap_{abx}$$

wherein $\Delta E_{abx}$ is the remaining energy value for that particular abnormal battery subsystem 26A. The low integration bound value (x) and the remaining energy value $\Delta E_{abx}$ are calculated for each of the abnormal battery subsystems 26A, other than the weakest abnormal battery subsystem 26A. The processor 30 may be programmed to summate the remaining energy value for all of the normal battery subsystems 26B ($\Delta E_{norm}$), the remaining energy value for the weakest of the abnormal battery subsystems 26A ($\Delta E_{ab1}$), and the remaining energy values for each of the remaining abnormal battery subsystems 26A ($\Delta E_{abx}$) to determine the global remaining energy value for the battery system 24.

As mentioned above, the battery subsystems 26 may be arranged as one or more battery packs. In one example, the battery subsystem 26 comprises two battery packs configured to alternate between series and parallel connection therebetween. As such, the polar voltage and open circuit voltage of the battery packs are combined in series and separate in parallel. Therefore, global remaining energy value is between series and parallel connection. More specifically, the global remaining energy value of the battery packs in series ($\Delta E_{series}$) is equal to the summation of the remaining energy values of the battery packs. The global remaining energy value of the battery packs in parallel ($\Delta E_{parallel}$) is equal to the summation of the remaining energy values of the battery packs, multiplied by a self-balancing efficiency that characterizes a certain loss due to self-charging to balance among the parallel connected packs. Depending on the demands of the electric vehicle 22, the battery packs switch between parallel and series configuration. Therefore, the processor 30 may be programmed to calculate an adjusted global remaining energy value ($\Delta E_{adj\text{-}glob}$) according to as an example of two parallel connected packs:

$$\Delta E_{adj\text{-}glob} = \eta(\Delta Ep1 + \Delta Ep2)$$

wherein $\Delta Ep1$ is the remaining energy value of one of the battery packs, wherein $\Delta Ep2$ is the remaining energy value of the other one of the battery packs, and wherein $\eta$ is the self-balancing efficiency. The self-balancing efficiency is around 0.98-0.995, depending on the resistance heat loss in the packs and at what degrees of imbalance between the packs.

The processor 30 may be further programmed to calculate an actual energy consumption rate value of the electric vehicle 22 based on at least one vehicle consumption rate variable and calculate a remaining travel range value based on the global remaining energy value and the actual energy consumption rate value. In one example, the vehicle consumption rate variable is a velocity of the electric vehicle 22. The higher the velocity, the higher the actual energy consumption rate value of the electric vehicle 22 as the electric vehicle 22 demands more energy to propel the vehicle 22. The higher the actual energy consumption rate value, the lower the remaining travel range value.

Figure 3:
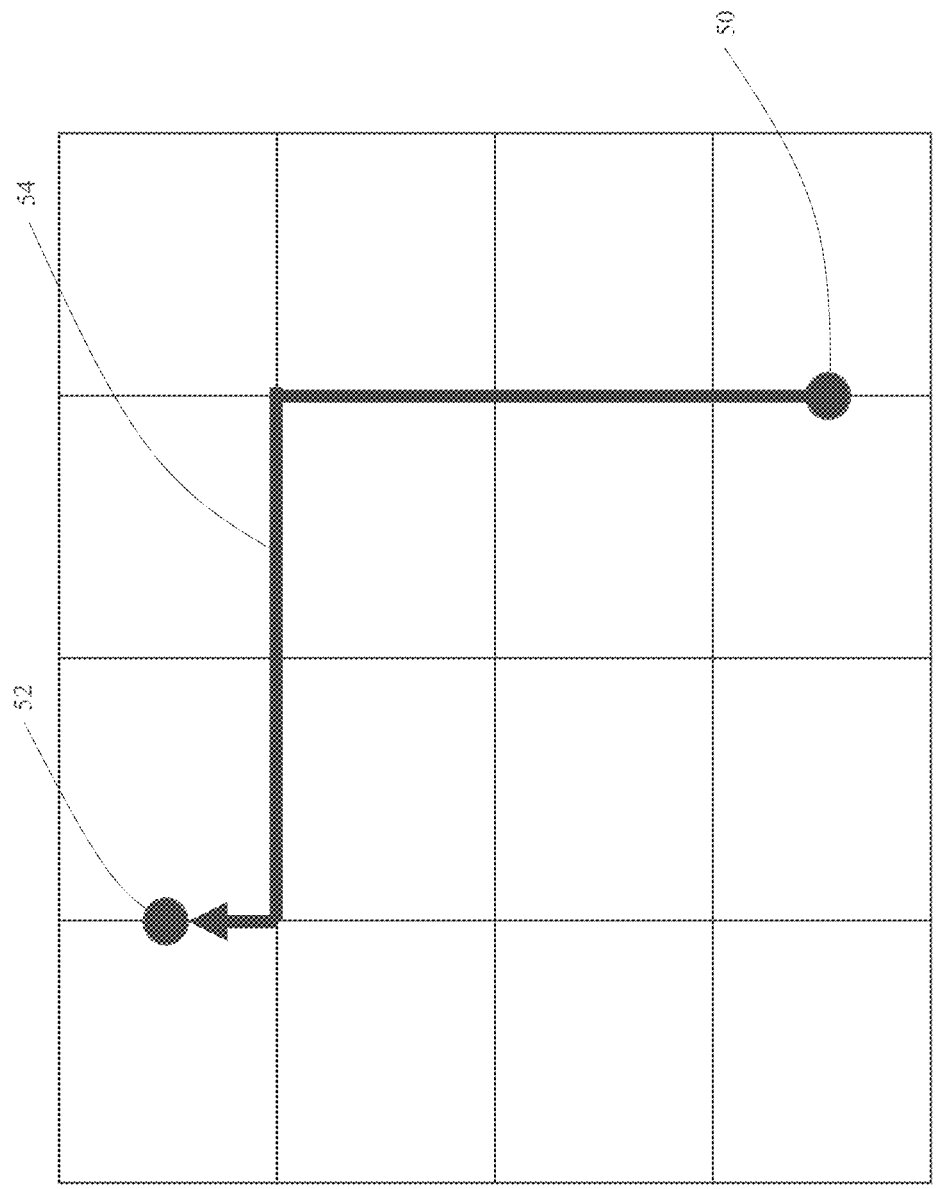
FIG. 3 is a schematic view of a map showing a location of the electric vehicle, a destination of the electric vehicle, and a route therebetween.

The processor 30 may be further programmed to communicate with a global navigation satellite system (GNSS) network 48 (as shown in FIG. 1) to ascertain a location 50 of the electric vehicle 22 and a destination 52, calculate a travel distance value from a route 54 between the location 50 of the electric vehicle 22 and the destination 52 (as shown in FIG. 3), compare the remaining travel range value to the travel distance value, and determine if the electric vehicle 22 will reach the destination 52. More specifically, the electric vehicle 22 may include an antenna 56 in wireless communication with the GNSS network 48, as shown in FIG. 1. The antenna 56 is in electronic communication with the supervisory computer 28. The processor 30 may communicate with the GNSS network 48 to ascertain the location 50 of the electric vehicle 22 in real-time. The processor 30 may also communicate with the GNSS network 48 to spatially locate the destination 52 relative to the location 50 of the electric vehicle 22. Based upon pre-programmed travel corridors stored within the at least one non-transitory computer-readable medium 32 the route 54 between the location 50 of the electric vehicle 22 and the destination 52 on the travel corridors may be determined. From the route 54, the travel distance value between the location 50 of the electric vehicle 22 and the destination 52 may be calculated. The remaining travel range value and the travel distance value are both units of measurement. As such, the remaining travel range value and the travel distance value may be compared to determine if the electric vehicle 22 will reach the destination 52. If the remaining travel range value is greater than or equal to the travel distance value, the electric vehicle 22 will arrive at the destination 52.

The processor 30 may be further programmed to calculate a maximum energy consumption rate value based upon the travel distance value and adjust the vehicle consumption rate variable to lower the actual energy consumption rate value to be less than or equal to the maximum energy consumption rate value if the remaining travel range value is less than the travel distance value. More specifically, the maximum energy consumption rate value directly correlates to the travel distance value and traffic flow on the route. As such, adjusting the vehicle consumption rate variable can raise or lower the actual energy consumption rate. As described above, the vehicle consumption rate variable may be the velocity of the electric vehicle 22; however, any suitable vehicle consumption rate variable may be adjusted. The processor 30 may be programmed to adjust the vehicle consumption rate variable may be further defined as the processor 30 being programmed to lower the velocity of the electric vehicle 22 to lower the actual energy consumption rate value to be less than or equal to the maximum energy consumption rate value if the remaining travel range value is less than the travel distance value. In the example shown in the Figures, the electric vehicle 22 comprises at least one electric motor 58 arranged to propel the electric vehicle 22. The processor 30 may limit the commutation of the electric motor 58 prevent the electric vehicle 22 from traveling above a velocity that causes the actual energy consumption rate value from being greater than the maximum energy consumption rate value.

In one example, the destination 52 is further defined as an automotive service center suited to service the abnormal battery subsystem 26A. More specifically, the processor 30 may communicate with the GNSS network 48 to ascertain the location 50 of one or more automotive service centers within proximity of the location 50 of the electric vehicle 22, ascertain routes 54 to each of the automotive service centers, calculate the travel distance value between the location 50 of the electric vehicle 22 and each of the automotive service centers, and determine the optimal automotive service center to travel to based upon the remaining travel range value and the travel distance values of the automotive service stations. However, the destination 52 may be a charge station or the residence of the electric vehicle operator, an emergency location (such as a police department), or any other suitable location from which the electric vehicle operator may obtain new charge or service for the abnormal battery subsystem 26A.

The energy management system 20 may further comprise a navigation interface 60 as shown in FIG. 1. The navigation interface 60 is configured to provide navigation instructions to an operator of the electric vehicle 22. Non-limiting examples of the navigation interface 60 include an interactive map on a visual display, visual turn-by-turn instructions on a heads-up-display (HUD) projected on a windshield of the vehicle 22, and audible turn-by-turn instructions spoken over the speakers of the vehicle 22. The processor 30 is further programmed to construct the navigation instructions from the route 54 between the location 50 of the electric vehicle 22 and the destination 52 and transmit the navigation instructions to the navigation interface 60 for dissemination to the operator.

The energy management system 20 may perform numerous automatic controls based upon any of the above-mentioned values, including (but not limited to) the global remaining energy value, the actual energy consumption rate value, the remaining travel range value, the travel distance value, and the maximum energy consumption rate value. For example, the energy management system 20 automatically change a performance mode of the electric vehicle 22 which controls performance features such as acceleration, maximum velocity, braking, etc. The energy management system 20 may also dynamically change the route 30 of the electric vehicle 22 to ensure that the electric vehicle reaches the destination 52. Furthermore, the energy management system 20 may change a mode or velocity of a cruise control to efficiently manage the remaining global remaining energy value of the battery system 24.

Figure 4:
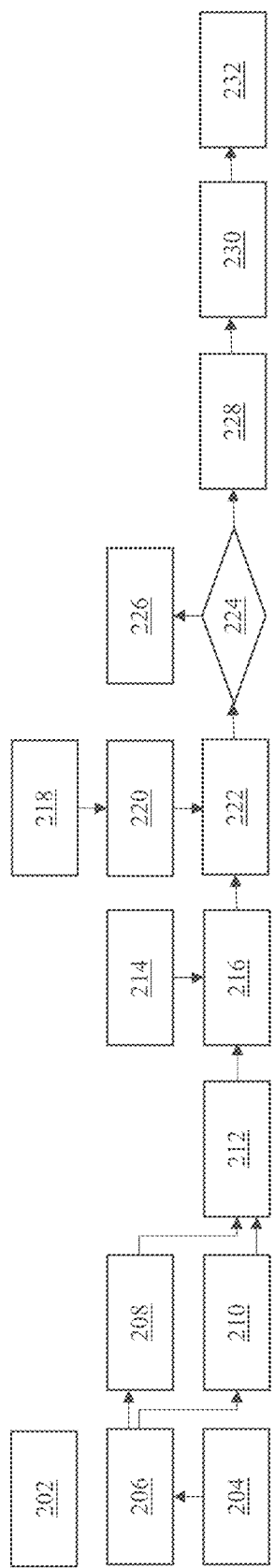
FIG. 4 is a flow chart showing a method of operating the supervisory computer for the energy management system.

A method 200 of operating the supervisory computer 28 for the energy management system 20 of the electric vehicle 22 is also disclosed herein and shown in FIG. 4. The method comprises monitoring the remaining state of charge, the capacity, and the resistance of the battery system 24 as shown in box 202 and monitoring remaining state of charge and a capacity of the abnormal battery subsystem 26A as shown in box 204. The method further comprises calculating a low integration bound value from the remaining state of charge and capacity of the battery system 24 and from the remaining state of charge and the capacity of the abnormal battery subsystem 26A as shown in box 206. The method further comprises calculating a remaining energy value for all of the normal battery subsystems 26B with respect to the low integration value as shown in box 208, calculating a remaining energy value for the abnormal battery subsystem 26A as shown in box 210, and summating the remaining energy values of the normal battery subsystems 26B and the abnormal battery subsystem 26A to determine a global remaining energy value for the battery system 24 as shown in box 212.

The method may further comprise calculating the actual energy consumption rate value of the electric vehicle 22 based on at least one vehicle consumption rate variable as shown in box 214 and calculating the remaining travel range value based on the global remaining energy value and the actual energy consumption rate value as shown in box 216. The method may further comprise communicating with the GNSS network 48 to ascertain the location 50 of the electric vehicle 22 and the destination 52 as shown in box 218, calculating the travel distance value from the route 54 between the location 50 of the electric vehicle 22 and the destination 52 as shown in box 220, comparing the remaining travel range value to the travel distance value as shown in box 222, and determining if the electric vehicle 22 will reach the destination 52 as shown in box 224.

If the electric vehicle 22 will reach the destination 52, the vehicle 22 proceeds to the destination 52 unchanged, as shown in box 226. If the electric vehicle 22 will not reach the destination 52, the method may further comprise calculating the maximum energy consumption rate value based upon the travel distance value as shown in box 228 and adjusting the vehicle consumption rate variable to lower the actual energy consumption rate value to be less than or equal to the maximum energy consumption rate value if the remaining travel range value is less than the travel distance value as shown in box 230. As mentioned above, the vehicle consumption rate variable may be the velocity of the electric vehicle 22. Therefore, adjusting the vehicle consumption rate variable as shown in box 230 may be further defined as lowering the velocity of the electric vehicle 22 to lower the actual energy consumption rate value to be less than or equal to the maximum energy consumption rate value if the remaining travel range value is less than the travel distance value. As mentioned above, the energy management system 20 may further comprise the navigation interface 60 configured to provide navigation instructions to the operator of the electric vehicle 22. The method further comprises constructing the navigation instructions from the route 54 between the location 50 of the electric vehicle 22 and the destination 52 and transmitting the navigation instructions to the navigation interface 60 for dissemination to the operator as shown in box 232.

Calculating the low integration bound value from the remaining state of charge and capacity of the battery system 24 and from the remaining state of charge and the capacity of the abnormal battery subsystem 26A as shown in box 206 may be further defined as calculating the low integration bound value according to:

$$a = SOC_{rem} + \frac{SOC_{ab1-rem} Cap_{ab1}}{Cap}$$

wherein a is the low integration bound value, wherein $SOC_{rem}$ is the remaining state of charge of the battery system 24, wherein Cap is the capacity of the battery system 24, wherein $SOC_{ab1-rem}$ is the remaining state of charge of the abnormal battery subsystem 26A, and wherein $Cap_{ab1}$ is the capacity of the abnormal battery subsystem 26A. Furthermore, calculating the remaining energy value for all of the normal battery subsystems 26B with respect to the low integration value as shown in box 208 may be further defined as calculating the remaining energy value for all of the normal battery subsystems 26B according to:

$$\Delta E_{norm} = (n_{normal})[\int_a^{SOC_{rem}}(V_{oc} - V_{polar})dSOC]Cap$$

wherein $\Delta E_{norm}$ is the remaining energy value for all of the normal battery subsystems 26B, wherein $n_{normal}$ is the number of normal battery subsystems 26B, wherein $V_{oc}$ is the open circuit voltage of one of the normal battery subsystems 26B, and wherein $V_{polar}$ is the polar voltage of one of the normal battery subsystems 26B, according to the resistance of one of the normal battery subsystems 26B.

Calculating the remaining energy value for the abnormal battery subsystem 26A as shown in box 210 may be further defined as calculating the remaining energy value for the abnormal battery subsystem 26A according to:

$$\Delta E_{ab} = (n_{normal})[\int_0^{SOC_{ab1-rem}}(V_{oc} - V_{polar})dSOC]Cap_{ab1}$$

wherein $\Delta E_{ab}$ is the remaining energy value for the abnormal battery subsystem 26A.

Accordingly, the supervisory computer 28, the energy management system 20, and the corresponding method 200 offer several advantages. Calculating the remaining energy value of each battery subsystem 26 and summating those values to generate a global remaining energy value accounts for the abnormal battery subsystem 26A continuously drawing from the charge of the normal battery subsystems 26B. Furthermore, calculating the remaining travel range value in view of the abnormal battery subsystem 26A and determining a destination 52 that the electric vehicle 22 can reach ensures the operator will not be stranded during their commute. The problems described above are unique to particular technical field. The advantages described herein resolve those problems.

The description of the present disclosure is merely exemplary in nature and variations that do not depart from the general sense of the present disclosure are intended to be within the scope of the present disclosure. Such variations are not to be regarded as a departure from the spirit and scope of the present disclosure.

What is claimed is:

1. A supervisory computer for an energy management system of an electric vehicle, with the energy management system comprising a battery system configured to power the electric vehicle and comprised of a plurality of battery subsystems, with one of the battery subsystems further defined as an abnormal battery subsystem and with the remaining battery subsystems further defined as normal battery subsystems, the supervisory computer comprising:
- at least one processor; and
- at least one non-transitory computer-readable medium including instructions such that the processor is programmed to:
  - monitor a remaining state of charge, a capacity, and a resistance of the battery system;
  - monitor a remaining state of charge and a capacity of the abnormal battery subsystem;
  - calculate a low integration bound value from the remaining state of charge and capacity of the battery system and from the remaining state of charge and the capacity of the abnormal battery subsystem;
  - calculate a remaining energy value for all of the normal battery subsystems with respect to the low integration value;
  - calculate a remaining energy value for the abnormal battery subsystem;
  - summate the remaining energy values of the normal battery subsystems and the abnormal battery subsystem to determine a global remaining energy value for the battery system;
  - calculate an actual energy consumption rate value of the electric vehicle based on at least one vehicle consumption rate variable;
  - calculate a remaining travel range value based on the global remaining energy communicate with a global navigation satellite system (GNSS) network to ascertain a location of the electric vehicle and a destination;
  - calculate a travel distance value from a route between the location of the electric vehicle and the destination;
  - compare the remaining travel range value to the travel distance value;
  - determine if the electric vehicle will reach the destination;
  - calculate a maximum energy consumption rate value based upon the travel distance value; and
  - adjust the vehicle consumption rate variable to lower the actual energy consumption rate value to be less than or equal to the maximum energy consumption rate value if the remaining travel range value is less than the travel distance value.

2. The supervisory computer of claim 1 wherein the processor being programmed to calculate the low integration bound value from the remaining state of charge and capacity of the battery system and from the remaining state of charge and the capacity of the abnormal battery subsystem is further defined as the processor being programmed to calculate the low integration bound value according to:

$$a = SOC_{rem} + \frac{SOC_{ab1\text{-}rem}Cap_{ab1}}{Cap}$$

wherein a is the low integration bound value;
wherein $SOC_{rem}$ is the remaining state of charge of the battery system;
wherein Cap is the capacity of the battery system;
wherein $SOC_{ab1\text{-}rem}$ is the remaining state of charge of the abnormal battery subsystem; and
wherein $Cap_{ab1}$ is the capacity of the abnormal battery subsystem.

3. The supervisory computer of claim 2 wherein the processor being programmed to calculate the remaining energy value for all of the normal battery subsystems with respect to the low integration value is further defined as the processor being programmed to calculate the remaining energy value for all of the normal battery subsystems according to:

$$\Delta E_{norm} = (n_{normal})[\int_a^{SOC_{rem}}(V_{oc} - V_{polar})dSOC]Cap$$

wherein $\Delta E_{norm}$ is the remaining energy value for all of the normal battery subsystems;
wherein $n_{normal}$ is the number of normal battery subsystems;
wherein $V_{oc}$ is the open circuit voltage of one of the normal battery subsystems; and
wherein $V_{polar}$ is the polar voltage of one of the normal battery subsystems, according to the resistance of one of the normal battery subsystems.

4. The supervisory computer of claim 2 wherein the processor being programmed to calculate the remaining energy value for the abnormal battery subsystem is further defined as the processor being programmed to calculate the remaining energy value for the abnormal battery subsystem according to:

$$\Delta E_{ab} = [\int_0^{SOC_{ab1\text{-}rem}}(V_{oc} - V_{polar})dSOC]Cap_{ab1}$$

wherein $\Delta E_{ab}$ is the remaining energy value for the abnormal battery subsystem.

5. The supervisory computer of claim 1, wherein the abnormal battery subsystem is chemically different from the normal battery subsystem.

6. The supervisory computer of claim 1, wherein the vehicle consumption rate variable is a velocity of the electric vehicle.

7. The supervisory computer of claim 1, wherein the abnormal battery subsystem holds a lower charge than the normal battery subsystem.

8. The supervisory computer of claim 1 further comprising a plurality of abnormal battery subsystems, and wherein the processor is further programmed to calculate the remaining energy value for a weakest of the plurality of abnormal battery subsystems.

9. An energy management system for an electric vehicle, the system comprising:
- a battery system configured to power the electric vehicle and comprised of a plurality of battery subsystems, with one of the battery subsystems further defined as an abnormal battery subsystem and with the remaining battery subsystems further defined as normal battery subsystems; and
- a supervisory computer comprising:
  - at least one processor; and
  - at least one non-transitory computer-readable medium including instructions such that the processor is programmed to:
    - monitor a remaining state of charge, a capacity, and a resistance of the battery system;
    - monitor a remaining state of charge and a capacity of the abnormal battery subsystem;
    - calculate a low integration bound value from the remaining state of charge and capacity of the battery system and from the remaining state of charge and the capacity of the abnormal battery subsystem;
    - calculate a remaining energy value for all of the normal battery subsystems with respect to the low integration value;

calculate a remaining energy value for the abnormal battery subsystem;
summate the remaining energy values of the normal battery subsystems and the abnormal battery subsystem to determine a global remaining energy value for the battery system;
calculate an actual energy consumption rate value of the electric vehicle based on at least one vehicle consumption rate variable;
calculate a remaining travel range value based on the global remaining energy communicate with a global navigation satellite system (GNSS) network to ascertain a location of the electric vehicle and a destination;
calculate a travel distance value from a route between the location of the electric vehicle and the destination;
compare the remaining travel range value to the travel distance value;
determine if the electric vehicle will reach the destination;
calculate a maximum energy consumption rate value based upon the travel distance value; and
adjust the vehicle consumption rate variable to lower the actual energy consumption rate value to be less than or equal to the maximum energy consumption rate value if the remaining travel range value is less than the travel distance value.

10. The energy management system of claim 9 further comprising a navigation interface configured to provide navigation instructions to an operator of the electric vehicle, with the processor of the supervisory computer further programmed to:
construct the navigation instructions from the route between the location of the electric vehicle and the destination; and
transmit the navigation instructions to the navigation interface for dissemination to the operator.

11. The energy management system of claim 9 further comprising a plurality of abnormal battery subsystems, and wherein the processor is further programmed to calculate the remaining energy value for a weakest of the plurality of abnormal battery subsystems.

12. The energy management system of claim 9, wherein the abnormal battery subsystem holds a lower charge than the normal battery subsystem.

13. A method of operating a supervisory computer for an energy management system of an electric vehicle, with the energy management system comprising a battery system configured to power the electric vehicle and comprised of a plurality of battery subsystems, with one of the battery subsystems further defined as an abnormal battery subsystem and with the remaining battery subsystems further defined as normal battery subsystems, and with the supervisory computer comprising at least one processor and at least one non-transitory computer-readable medium, the method comprising:
monitoring a remaining state of charge, a capacity, and a resistance of the battery system;
monitoring a remaining state of charge and a capacity of the abnormal battery subsystem;
calculating a low integration bound value from the remaining state of charge and capacity of the battery system and from the remaining state of charge and the capacity of the abnormal battery subsystem;
calculating a remaining energy value for all of the normal battery subsystems with respect to the low integration value;
calculating a remaining energy value for the abnormal battery subsystem;
summating the remaining energy values of the normal battery subsystems and the abnormal battery subsystem to determine a global remaining energy value for the battery system;
calculating an actual energy consumption rate value of the electric vehicle based on at least one vehicle consumption rate variable;
calculating a remaining travel range value based on the global remaining energy value and the actual energy consumption rate value;
communicating with a global navigation satellite system (GNSS) network to ascertain a location of the electric vehicle and a destination;
calculating a travel distance value from a route between the location of the electric vehicle and the destination;
comparing the remaining travel range value to the travel distance value;
determining if the electric vehicle will reach the destination;
calculating a maximum energy consumption rate value based upon the travel distance value; and
adjusting the vehicle consumption rate variable to lower the actual energy consumption rate value to be less than or equal to the maximum energy consumption rate value if the remaining travel range value is less than the travel distance value.

14. The method of claim 13, wherein the vehicle consumption rate variable is a velocity of the electric vehicle, and wherein adjusting the vehicle consumption rate variable is further defined as lowering the velocity of the electric vehicle to lower the actual energy consumption rate value to be less than or equal to the maximum energy consumption rate value if the remaining travel range value is less than the travel distance value.

15. The method of claim 13, wherein the energy management system further comprises a navigation interface configured to provide navigation instructions to an operator of the electric vehicle, with the method further comprising:
constructing the navigation instructions from the route between the location of the electric vehicle and the destination; and
transmitting the navigation instructions to the navigation interface for dissemination to the operator.

16. The method of claim 13, wherein calculating the low integration bound value from the remaining state of charge and capacity of the battery system and from the remaining state of charge and the capacity of the abnormal battery subsystem is further defined as calculating the low integration bound value according to:

$$a = SOC_{rem} + \frac{SOC_{ab1\text{-}rem} Cap_{ab1}}{Cap}$$

wherein a is the low integration bound value;
wherein $SOC_{rem}$ is the remaining state of charge of the battery system;
wherein Cap is the capacity of the battery system;
wherein $SOC_{ab1\text{-}rem}$ is the remaining state of charge of the abnormal battery subsystem; and wherein $Cap_{ab1}$ is the capacity of the abnormal battery subsystem.

17. The method of claim 16, wherein calculating the remaining energy value for all of the normal battery subsystems with respect to the low integration value is further defined as calculating the remaining energy value for all of the normal battery subsystems according to:

$$\Delta E_{norm} = (n_{normal})[\int_a^{SOCrem}(V_{oc} - V_{polar})dSOC]Cap$$

wherein $\Delta E_{norm}$ is the remaining energy value for all of the normal battery subsystems;

wherein $n_{normal}$ is the number of normal battery subsystems;

wherein $V_{oc}$ is the open circuit voltage of one of the normal battery subsystems; and wherein $V_{polar}$ is the polar voltage of one of the normal battery subsystems, according to the resistance of one of the normal battery subsystems.

18. The method of claim 17, wherein calculating the remaining energy value for the abnormal battery subsystem is further defined as calculating the remaining energy value for the abnormal battery subsystem according to:

$$\Delta E_{ab} = [\int_0^{SOCab1\text{-}rem}(V_{oc} - V_{polar})dSOC]Cap_{ab1}$$

wherein $\Delta E_{ab}$ is the remaining energy value for the abnormal battery subsystem.

19. The method of claim 13, wherein the abnormal battery subsystem is chemically different from the normal battery subsystem.

20. The method of claim 13, wherein the abnormal battery subsystem holds a lower charge than the normal battery subsystem.

\* \* \* \* \*